United States Patent Office 3,553,230
Patented Jan. 5, 1971

3,553,230
3-AMINOALKYL AND 3-AMINO DERIVATIVES OF 4H[1]BENZOPYRANO[3,4-d]ISOXAZOLES
Jules Freedman, Milwaukee, Wis., assignor to Colgate-Palmolive Company, New York, N.Y., a corporation of Delaware
No Drawing. Filed Sept. 26, 1967, Ser. No. 670,786
Int. Cl. C07d 85/22
U.S. Cl. 260—307          5 Claims

ABSTRACT OF THE DISCLOSURE

The compounds are 3-aminoalkyl and 3-amino derivatives of 4H[1]benzopyrano[3,4-d]isoxazoles useful in the preparation of wood preservatives, moth proofing agents, pickling inhibitors and pharmaceutical agents. A species disclosed is 3 - aminomethyl - 4H[1]benzopyrano[3,4-d]isoxazole.

SUMMARY OF INVENTION

The present invention relates to novel 3-aminoalkyl derivatives of 4H[1]bendopyrano[3,4-d]isoxazoles, methods of preparing such compounds and compositions containing them.

DETAILED DESCRIPTION

The novel compounds of the present invention have the following formula

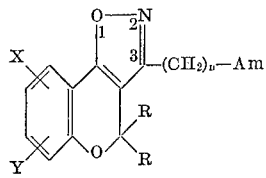

in which X and Y are the same or different members selected from hydrogen, halo such as chloro, bromo or fluoro, hydroxy, lower alkyl of 1 to 4 carbon atoms, nitro, methylenedioxy, lower alkoxy or trifluoromethyl, R is selected from hydrogen, lower alkyl of 1 to 4 carbon atoms, phenyl or nuclear substituted phenyl such as o-chlorophenyl and p-methoxyphenyl, n is 0 to 3 and Am is selected from (a) 

in which $R_2$ and $R_3$ are the same or different and are selected from hydrogen, lower alkyl of 1 to 4 carbon atoms such as methyl, ethyl, isopropyl or butyl, amino-lower alkyl, hydroxy-lower alkyl such as hydroxy ethyl, alkoxy alkyl, alkenyl of 3 to 6 carbon atoms such as allyl and hexenyl, an aralkyl of 7 to 13 carbon atoms such as benzyl, phenethyl and phenylisopropyl, a cycloalkyl of 3 to 7 carbon atoms such as cyclopropyl and cyclohexyl, a cycloalkyl-lower alkyl, in which the cycloalkyl contains 3 to 7 carbon atoms such as cyclohexyl-methyl and cyclopentyl-ethyl, an aryl, particularly phenyl, a nuclear substituted phenyl such as a halophenyl or a lower alkoxyphenyl, for example, p-chlorophenyl or p-methoxyphenyl, a heterocyclic group such as pyridyl, piperidyl, furyl, thienyl, pyrryl and pyrrolidyl and $COOR_2$.

(b) Groups in which $R_2$ and $R_3$ are joined together to form amino groups in which the nitrogen is part of a cyclic group such as morpholino, pyrrolidino, piperidino, 4-lower alkyl-1-piperazino such as 4-methyl-1-piperazino, N-phenyl-lower alkyl piperazino or N-hydroxy-lower alkyl piperazino, and (c) A cyclic amine group bonded through a nuclear carbon to the alkylene chain, including such groups as N-lower alkyl-3 or 4-piperidyls such as N-methyl-3-piperidyl, N - ethyl-4-piperidyl and N-isopropyl-3-piperidyl, N-(di-lower alkyl amino-lower alkyl)-3 or 4-piperidyls such as N-(beta-dimethylaminopropyl) - 4 - piperidyl and N-(beta-diethylaminoethyl) - 3 - piperidyl, N-phenyl-lower alkyl-3 or 4-piperidyls such as N-benzyl-3-piperidyl, N-phenylethyl-4-piperidyl and N-phenylpropyl - 3 - piperidyl, 3-piperidyl and 4-piperidyl, 3-pyrrolidyl, N-lower alkyl-3-pyrrolidyls such as N-ethyl-3-pyrrolidyl, N-phenyl-lower alkyl-3-pyrrolidyls such as N-phenylethyl-3-pyrrolidyl.

The compounds of the present invention may be conveniently prepared employing as the basic starting material a 4-chromanone of the formula

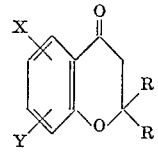

in which R, X and Y are as previously defined.

The unsubstituted 4-chromanone is a known compound and the substituted compounds may be prepared as described in the literature [C. D. Hurd, et al., J. Am. Chem. Soc., 76, 5065 (1954) and S. Wawzonek, et al., J. Am. Chem. Soc., 76, 1080 (1954)].

Representative of the 4-chromanones which may be employed in the described process are 4-chromanone,
6-methoxy-4-chromanone,
6-chloro-4-chromanone,
6-bromo-4-chromanone,
8-methyl-4-chromanone,
6-trifluoromethyl-4-chromanone,
2,2-dimethyl-4-chromanone,
2-phenyl-4-chromanone,
6-methyl-4-chromanone,
6,7-methylenedioxy-4-chromanone, and
6-chloro-2-phenyl-4-chromanone In the preferred method of preparation of the novel compounds a 4-chromanone is treated with a lower alkyl oxalate such as ethyl oxalate, in the presence of sodium hydride in an anhydrous reaction medium, such as toluene, to form a lower alkyl-4-oxochroman-3-glyoxylate. The ring closure is then effected by treating the glyoxylate with hydroxylamine-hydrochloride in ethanol under reflux conditions thus forming the lower alkyl-4H[1]benzopyrano[3,4-d]isoxazole-3-carboxylate.

The described process may be illustrated as follows:

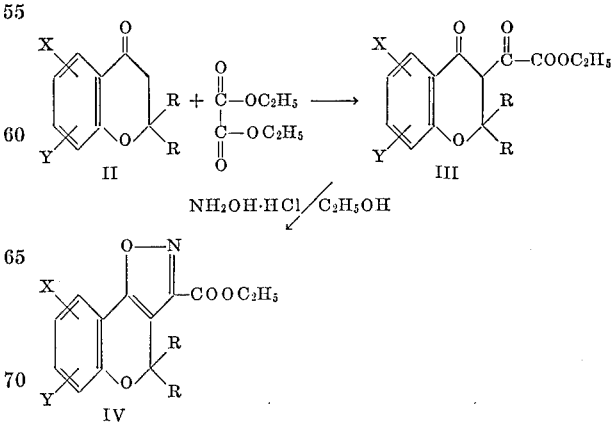

wherein R, X and Y are as previously defined and do not partake in or interfere with the reaction.

Representative of the compounds which may be prepared by the above processes are Ethyl 4-oxochroman-3-glyoxylate,
Ethyl 4H[1]benzopyrano[3,4-d]isoxazole-3-carboxylate,
Propyl 4H[1]benzopyrano[3,4-d]isoxazole-3-carboxylate,
Ethyl 6-chloro-4-oxochroman-3-glyoxylate,
Ethyl 6-methoxy-4-oxochroman-3-glyoxylate,
Methyl 7-methyl-4-oxochroman-3-glyoxylate,
Methyl 8-methoxy-4H[1]benzopyrano[3,4-d]isoxazole-3-carboxylate, and
Ethyl 8-chloro-4H[1]benzopyrano[3,4-d]isoxazole-3-carboxylate.

The lower alkyl-4H[1]benzopyrano[3,4-d]isoxazole-3-carboxylate (IV) may then be employed to prepare the corresponding amide, carboxyhydrazide and carboxylic acid derivatives by application of conventional techniques which may be illustrated as follows:

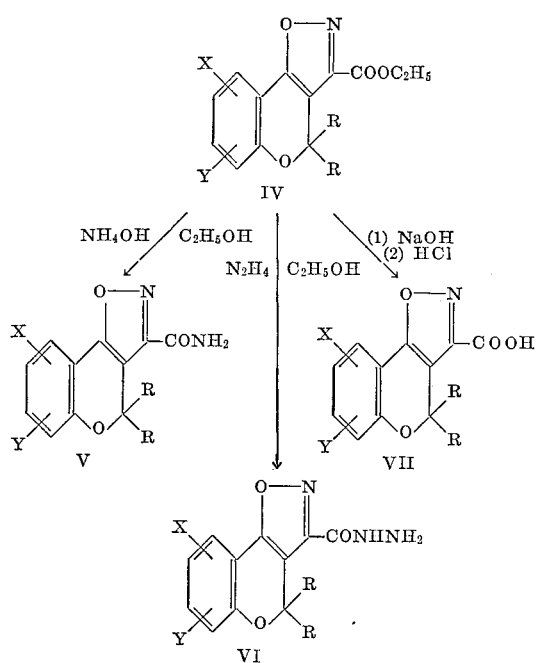

wherein R, X and Y are as previously defined and do not interfere with or partake in the reaction.

Representative of the compounds which may be prepared by the above processes are:

4H[1]benzopyrano[3,4-d]isoxazole-3-carboxamide,
4,4-dimethyl-4H[1]benzopyrano[3,4-d]isoxazole-3-carboxamide,
N - methyl - 7 - methoxy - 4H[1]benzopyrano[3,4-d]isoxazole-3-carboxamide,
N,N-dimethyl - 8 - trifluoromethyl - 4H[1]benzopyrano[3,4-d]isoxazole-3-carboxamide,
N-benzyl-4H[1]benzopyrano[3,4-d]isoxazole-3-carboxamide,
3-pyrrolidinocarbonyl-8-chloro-4H[1]benzopyrano[3,4-d]isoxazole,
4H[1]benzopyrano[3,4-d]isoxazole-3-carboxhydrazide,
8-chloro-4H[1]benzopyrano[3,4-d]isoxazole-3-carboxhydrazide,
8-methyl-4H[1]benzopyrano[3,4-d]isoxazole-3-carboxhydrazide,
8-trifluoromethyl-4H[1]benzopyrano[3,4-d]isoxazole-3-carboxhydrazide,
7-methoxy-4H[1]benzopyrano[3,4-d]isoxazole-3-carboxhydrazide,
N-methyl-4H[1]benzopyrano[3,4-d]isoxazole-3-carboxhydrazide,
4H[1]benzopyrano[3,4-d]isoxazole-3-carboxylic acid, and
8-chloro-4H[1]benzopyrano[3,4-d]isoxazole-3-carboxylic acid.

The 4H[1]benzopyrano[3,4-d]isoxazole - 3 - carboxamides thus obtained may be converted to the corresponding nitrile by treatment with thionyl chloride in dimethylformamide. The process may be illustrated as follows:

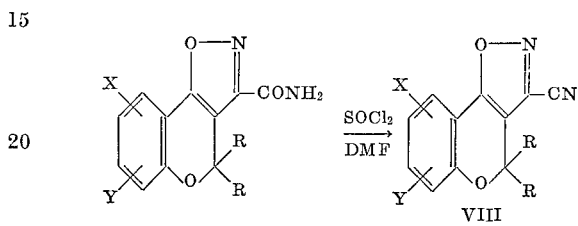

wherein R, X and Y are as previously defined and do not interfere with or partake in the reaction.

Representative of the compounds which may be prepared by the above process are:

4H[1]benzopyrano[3,4-d]isoxazole-3-carbonitrile,
8-chloro-4H[1]benzopyrano[3,4-d]isoxazole-3-carbonitrile,
6-methoxy-4H[1]benzopyrano[3,4-d]isoxazole-3-carbonitrile, and
7-methyl-4H[1]benzopyrano[3,4-d]isoxazole-3-carbonitrile.

The lower alkyl-4H[1]benzopyrano[3,4-d]isoxazole-3-carboxylate (IV) may then be employed to prepare the corresponding carboxyhydrazide derivative by treating it with hydrazine hydrate in a suitable solvent such as ethanol.

The process may be illustrated as follows:

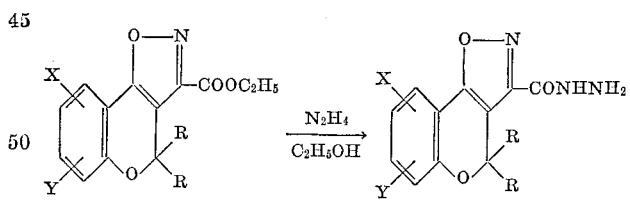

in which R, X and Y are as previously defined and do not interfere with or partake in the reaction.

Representative of the compounds which may be prepared in the described manner are the following:

4H[1]benzopyrano[3,4-d]isoxazole-3-carboxhydrazide,
6-chloro-4H[1]benzopyrano[3,4-d]isoxazole-3-carboxhydrazide,
8-chloro-4H[1]benzopyrano[3,4-d]isoxazole-3-carboxhydrazide, and
8-methoxy-4H[1]benzopyrano[3,4-d]isoxazole-3-carboxhydrazide.

The 4H[1]benzopyrano[3,4-d]isoxazole - 3 - carboxyhydrazides thus obtained may be used to prepare the corresponding carbamates, i.e., the compounds in which Am is $NR_2R_3$ and $R_3$ is $COOR_2$. In the preferred method of preparation the carboxyhydrazide derivative is treated with sodium nitrite in the presence of hydrochloric acid in a suitable reaction medium and appropriate alcohol, preferably under reflux conditions.

The process may be illustrated as follows:

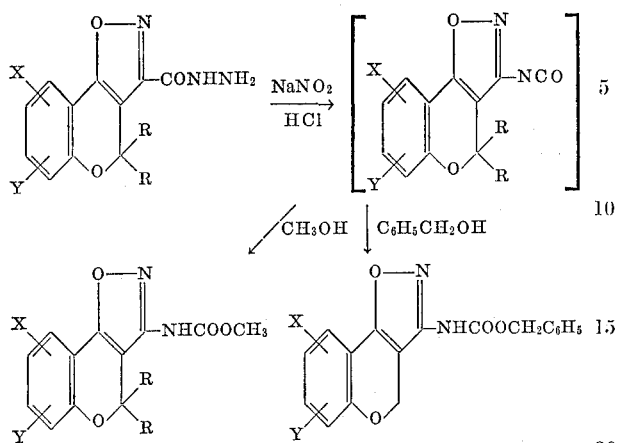

in which R, X and Y are as defined and represent groups which do not interfere with or partake in the reaction.

Representative of the compounds which may be prepared by the described process are the following:

Methyl 4H[1]benzopyrano[3,4-d]isoxazole-3-carbamate,
Benzyl 4H[1]benzopyrano[3,4-di]isoxazole-3-carbamate,
Methyl 6-chloro-4H[1]benzopyrano[3,4-d]isoxazole-3-carbamate,
Ethyl 8-chloro-4H[1]benzopyrano[3,4-d]isoxazole-3-carbamate, and
Benzyl 8-methoxy-4H[1]benzopyrano[3,4-d]isoxazole-3-carbamate The compounds in which $n$ is 1 and Am is $NH_2$ may be readily prepared by the reduction of the corresponding nitrile. In the preferred method of preparation the nitrile is dissolved in a suitable anhydrous solvent such as ether and treated with lithium aluminum hydride under reducing conditions to form the corresponding primary amine.

The process may be illustrated as follows:

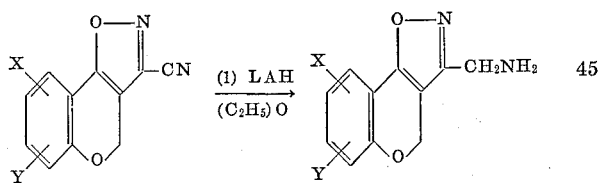

in which X and Y are as previously defined and do not partake in or interfere with the reaction.

Representative of the compounds which may be prepared by the described process are the following:

3-aminomethyl-4H[1]benzopyrano[3,4-d]isoxazole,
3-aminomethyl-6-chloro-4H[1]benzopyrano[3,4-d]isoxazole,
3-aminomethyl-8-chloro-4H[1]benzopyrano[3,4-d]isoxazole, and
3-aminomethyl-8-methoxy-4H[1]benzopyrano[3,4-]isoxazole The primary amines in which $n$ is larger than 1 may be prepared by treating the corresponding esters with lithium aluminum hydride to form the corresponding alcohol. The alcohol is then treated with tosyl chloride in a suitable solvent such as pyridine to form the tosylate. The tosylate is then treated with sodium cyanide to form the nitrile which can be either used to form the primary amine, or, if desired, the nitrile may be converted to the ester and the ester employed in a repeat performance of the described process thereby obtaining the next higher nitrile or amine. If desired, the tosylate derivative may be treated directly with an amine to form the desired amine derivative.

The described processes may be illustrated as follows:

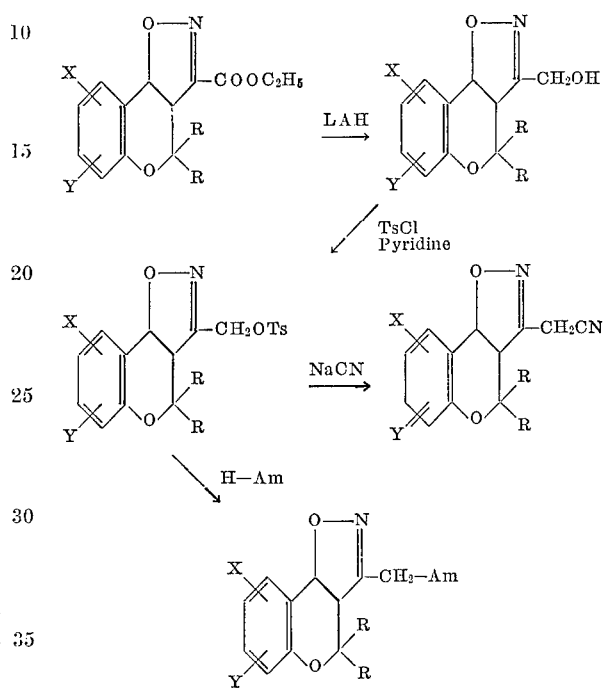

in which R, X and Y are as previously described and represent groups that do not interfere with or partake in the reaction.

Representative of the amines which can be prepared in the described manner are the following:

4H[1]benzopyrano[3,4-d]isoxazole-3-methylamine,
N-benzyl-8-chloro-4H[1]benzopyrano[3,4-d]isoxazole-3-methylamine,
N-cyclohexyl-8-chloro-4H[1]benzopyrano[3,4-d]isoxazole-3-methylamine,
N-isopropyl-8-chloro-4H[1]benzopyrano[3,4-d]isoxazole-3-methylamine,
3-(N-pyrrolidinomethyl)-8-chloro-4H[1]benzopyrano[3,4-d]isoxazole,
N,N-diethyl-8-chloro-4H[1]benzopyrano[3,4-d]isoxazole-3-methylamine.

The primary amines may be used to prepare a wide variety of secondary and tertiary amines by the application of conventional techniques. For example, the secondary and tertiary amines may be formed by simply treating the primary amine with a suitable organic halide.

Among the derivatives of the amines which can be prepared is the guanidino derivative. It may be prepared by treating the primary amine with methyl psuedothiourea in 70% aqueous ethanol under reflux conditions.

Acid addition salts of the compounds of the present invention capable of forming such salts may be conveniently produced by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds capable of forming such salts with a suitable alkylating agent such as dimethyl sulfate, or an alkyl halide such as methyl chloride, methyl iodide or ethyl bromide.

The thiocyanic acid addition salts of the compounds of this invention, when condensed with formaldehyde, form resinous materials useful as pickling inhibitors according to U.S. Pats. 2,425,320 and 2,606,155. The compounds also form fluosilicic acid addition salts which are useful as wood preservatives and moth proofing agents according to U.S. Pats. 1,915,334 and 2,075,359.

The compounds also form salts with penicillins. These salts have solubility characteristics which cause them to be useful in the purification and isolation of penicillins, particularly benzyl penicillin.

The novel compounds of the present invention and their pharmaceutically acceptable salts also have utility as muscle relaxants and antidepressant agents. In addition, these compounds are useful as intermediates in the preparation of more complex pharmaceutical and chemical compounds.

When intended for pharmaceutical use, the compounds are preferably combined with one or more suitable pharmaceutical diluents and additives and formed into unit dosage forms for oral or parenteral administration such as tablets, capsules and solutions.

The pharmaceutical diluents which may be employed may be either solids such as starch, talc or sugar, or liquids such as water or propylene glycol.

The unit dosage forms may contain a concentration of 0.1% to 10% or more by weight of one or more of the novel compounds. Generally, such dosage forms will contain about 5 to 150 mg. of the active ingredients.

The following examples are presented to illustrate this invention:

EXAMPLE 1

Ethyl 4-oxochroman-3-glyoxylate

A mixture of 74 g. (0.5 mole) of 4-chromanone and 146 g. (1.0 mole) of ethyl oxalate in 375 ml. of anhydrous toluene is added dropwise over 1.25 hours to a suspension of sodium hydride (from 54.4 g. of a 53.3% oil-hydride mixture) in 1 liter of anhydrous toluene under an atmosphere of nitrogen. After stirring at room temperature overnight the reaction mixture is added to 1 kg. of ice and stirred 1 hour. The aqueous layer is separated and the organic phase extracted with five 250 ml. portions of $H_2O$. Acidification of the combined extracts with 75 ml. of concentrated hydrochloric acid gives a precipitate of 115.6 g. (94%) of a bright yellow solid. Recrystallization from 200 ml. of ethanol gave ethyl 4-oxochroman-3-glyoxylate, M.P. 72–79°.

*Analysis.*—Calcd. for $C_{13}H_{12}O_5$ (percent): C, 62.90; H, 4.87. Found (percent): C, 62.68; H, 5.03.

EXAMPLE 2

Ethyl 4H[1]benzopyrano[3,4-d]isoxazole-3-carboxylate

A mixture of 99.2 g. (0.4 mole) of ethyl 4-oxochroman-3-glyoxylate, 29.6 g. (0.425 mole) of hydroxylaminehydrochloride and 800 ml. of ethanol are refluxed for 18 hours, 200 ml. of solvent distilled and the residue cooled to give 83.9 g. of the isoxazole, M.P. 88–92°. Recrystallization from cyclohexane provides the pure ester, ethyl 4H[1]benzopyrano[3,4-d]isoxazole-3-carboxylate, M.P. 90–92°.

*Analysis.*—Calcd. for $C_{13}H_{11}NO_4$ (percent): C, 63.68; H, 4.53; N, 5.71. Found (percent): C, 63.92; H, 4.67; N, 5.56.

EXAMPLE 3

4H[1]benzopyrano[3,4-d]isoxazole-3-carboxylic acid

A solution of 4.9 g. (0.02 mole) of ethyl 4H[1]benzopyrano[3,4-d]isoxazole-3-carboxylate in 25 ml. of warm ethanol is treated with a solution of 1.5 g. of potassium hydroxide in 25 ml. of ethanol. The precipitate which forms immediately is washed with ethanol and dried to give 4.0 g. of potassium salt. Treatment of the salt with dilute hydrochloric acid for 5–10 minutes on a steam bath gives the acid, 4H[1]benzopyrano[3,4-d]isoxazole-3-carboxylic acid, M.P. 187.5°, after recrystallization from isopropanol.

*Analysis.*—Calcd. for $C_{11}H_7NO_4$ (percent): C, 60.83; H, 3.25; N, 6.45. Found (percent): C, 60.69; H, 3.09; N, 6.64.

EXAMPLE 4

4H[1]benzopyrano[3,4-d]isoxazole-3-carboxamide

A solution of 83.9 g. (0.34 mole) of ethyl 4H[1]benzopyrano[3,4-d]isoxazole-3-carboxylate in 850 ml. of warm alcohol is treated with 250 ml. of concentrated aqueous ammonia and the precipitate filtered after 2 hours to give 4H[1]benzopyrano[3,4-d]disoxazole-3-carboxamide, M.P. 233–236°

*Analysis.*—Calcd. for $C_{11}H_8N_2O_3$ (percent): C, 61.11; H, 3.73; N, 12.95. Found (percent): C, 60.93; H, 3.95; N, 12.52.

EXAMPLE 5

4H[1]benzopyrano[3,4-d]isoxazole-3-carbonitrile

A solution of 70.7 g. (0.327 mole) of 4H[1]benzopyrano[3,4-d]isoxazole-3-carboxamide in 650 ml. of dimethylformamide at 60° is treated dropwise over 20 minutes with 48.6 g. (0.4 mole) of thionyl chloride. The addition is slightly exothermic and is maintained at 55–63° without external heat. After stirring 5 hours at 60° and at room temperature overnight the mixture is poured into several liters of water and the solids filtered and dried. Recrystallization from one liter of cyclohexane gives 4H[1]benzopyrano[3,4-d]isoxazole-3-carbonitrile, M.P. 127–131°. An analytical sample prepared by recrystallization from methanol melts at 132–134°.

*Analysis.*—Calcd. for $C_{11}H_6N_2O_2$ (percent): C, 66.66; H, 3.05; N, 14.13. Found (percent): C, 66.79; H, 2.96; N, 14.03.

EXAMPLE 6

4H[1]benzopyrano[3,4-d]isoxazole-3-carboxhydrazide

A stirred solution of 16.8 g. (0.069 mole) of ethyl 4H[1]benzopyrano[3,4-d]isoxazole-3-carboxylate in 250 ml. of warm ethanol is treated all at once with a solution of 27.6 g. (0.069 mole) of hydrazine hydrate in 100 ml. of ethanol. After heating gently on the steam bath for 30 minutes, the mixture is cooled and the solid filtered to give 4H[1]benzopyrano[3,4-d]isoxazole-3-carboxhydrazide, M.P. 197–199°. A sample recrystallized from isopropanol melts at 195°.

*Analysis.*—Calcd. for $C_{11}H_8N_3O_3$ (percent): C, 57.14; H, 3.93; N, 18.18. Found (percent): C, 56.83; H, 3.71; N, 18.05.

EXAMPLE 7

Methyl 4H[1]benzopyrano[3,4-d]isoxazole-3-carbamate

While cooling in an ice salt bath, a suspension of 7.5 g. of 4H[3,4-d]isoxazole-3-carboxhydrazide in 300 ml. of water, 200 ml. of ether, and 3.0 ml. of concentrated hydrochloric acid is treated with a solution of 2.3 g. of sodium nitrite in 25 ml. of water. After stirring overnight at room temperature, the ether layer is separated and dried over magnesium sulfate. The dried ether layer is added to a mixture of 100 ml. of anhydrous toluene and 20 ml. of methanol and the ether distilled from the mixture. The remaining solution is refluxed for 18 hours and the solvents evaporated with a stream of air. The solids are chromatographed on 100 g. of silica and a fraction of 1.2 g. which eluted with benzene-ethyl acetate (9:1) is recrystallized twice from cyclohexane to give methyl 4H[1]benzopyrano[3,4-d]isoxazole - 3 - carbamate, M.P. 165–167°.

*Analysis.*—Calcd. for $C_{12}H_{10}N_2O_4$ (percent): C, 58.54; H, 4.10; N, 11.38. Found (percent): C, 58.75; H, 4.25; N, 11.66.

EXAMPLE 8

Benzyl 4H[1]benzopyrano[3,4-d]isoxazole-3-carbamate

A suspension of 14.3 g. (0.062 mole) of 4H[1]benzopyrano[3,4-d]isoxazole-3-carboxhydrazide in a mixture of 300 ml. of water containing 5.75 g. (0.069 mole) of concentrated hydrochloric acid and 200 ml. of xylene is treated with 4.45 g. (0.065 mole) of sodium nitrite in 25 ml. of water and the mixture stirred overnight. The xylene layer is separated and dried with sodium sulfate. The dried xylene solution is diluted to 600 ml. with anhydrous xylene and a 300 ml. aliquot refluxed for 20 hours with 6.5 g. (0.06 mole) of benzyl alcohol. On refrigeration, benzyl 4H[1]benzopyrano[3,4-d]isoxazole-3-carbamate, M.P. 183–185° is obtained. Recrystallization from benzene gives 3.4 g. of product, M.P. 199.5–200.5°.

*Analysis.*—Calcd. for $C_{18}H_{14}N_2O_4$ (percent): C, 67.07; H, 4.38; N, 8.69. Found (percent): C, 66.73; H, 4.41; N, 8.86.

EXAMPLE 9

4H[1]benzopyrano[3,4-d]isoxazole-3-methylamine maleate

A solution of 4.0 g. (0.02 mole) of 4H[1]benzopyrano [3,4-d]isoxazole-3-carbonitrile in 40 ml. of benzene-ether (3:5) is added dropwise over 30 minutes to a mixture of 1.0 g. (0.026 mole) of lithium aluminum hydride and 200 ml. of anhydrous ether. After 3 hours, 10 ml. of water is added cautiously and stirring continued for 2 hours. The ether solution is decanted from the remaining semisolid and treated with a solution of maleic acid in ether. The precipitated salt is recrystallized from isopropanol and then ethanol to yield 4H[1]benzopyrano[3,4-d]isoxazole-3-methylamine maleate, M.P. 187–188°.

*Analysis.*—Calcd. for $C_{15}H_{14}N_2O_6$ (percent): C, 56.60; H, 4.44; N, 8.80. Found (percent): C, 56.62; H, 4.19; N, 8.53.

EXAMPLE 10

8-chloro-4H[1]benzopyrano[3,4-d]isoxazole-3-methyl tosylate

A mixture of 5.0 g. (0.021 mole) of 8-chloro-4H[1] benzopyrano[3,4-d]isoxazole-3-methanol, 0.85 g. (0.021 mole) of 59% NaH/oil and 100 ml. of dry benzene is stirred for one hour, cooled in ice and treated with 4.19 g. (0.022 mole) of tosyl chloride in benzene dropwise. After stirring overnight 20 ml. of water is added and the insoluble solids (0.8 g., M.P. 143–145°) are filtered. The benzene solution is washed with 50 ml. of 10% $K_2CO_3$ and 2×50 ml. of water. After drying over $MgSO_4$ the solvent is removed to give 8-chloro-4H[1]benzopyrano [3,4-d]isoxazole-3-methyl tosylate, M.P. 110–112°. Recrystallization from benzene-cyclohexane and $CCl_4$ raises the melting point to 118–120°.

*Analysis.*—Calcd. for $C_{18}H_{14}ClNO_5S$ (percent): C, 55.18; H, 3.60; Cl, 9.05; N, 3.57; S, 8.18. Found (percent): C, 55.20; H, 3.80; Cl, 9.06; N, 3.55; S, 8.14.

EXAMPLE 11

N-benzyl - 8 - chloro-4H[1]benzopyrano[3,4-d]isoxazole-3-methylamine hydrochloride A solution of 8.0 g. (0.022 M) of the above tosylate in 100 ml. of dry benzene is added dropwise to a solution of 4.7 g. (0.044 M) of freshly distilled benzylamine in 25 ml. of benzene. The mixture is refluxed for 2 hours and after cooling 25 ml. of water is added, M.P. 183–85°.

The benzene solution is shaken with a mixture of 10 ml. 6 N HCl and 15 ml. of water; insoluble solids form on shaking. Recrystallization from methanol and then ethanol gives N-benzyl - 8 - chloro-4H[1]benzopyrano [3,4-d]isoxazole - 3 - methylamine hydrochloride, M.P. 218–23°.

*Analysis.*—Calcd. for $C_{18}H_{16}Cl_2N_2O_2$ (percent): C, 59.51; H, 4.41; Cl, 19.58; N, 7.72. Found (percent): C, 59.49; H, 4.32; Cl, 19.40; N, 7.68.

EXAMPLE 12

N-cyclohexyl - 8 - chloro - 4H[1]benzopyrano[3,4-d] isoxazole-3-methylamine hydrochloride This compound is prepared in the same manner as above from 8.0 g. (0.022 M) of the tosylate, and 4.4 g. (0.022 M) of cyclohexylamine. Addition of water gives two clear layers. Shaking the benzene layer with a mixture of 10 ml. of 6 N HCl and 15 ml. of water gives a solid precipitate. Recrystallization from methanol gives N-cyclohexyl - 8 - chloro-4H[1]benzopyrano[3,4-d]isoxazole-3-methylamine hydrochloride, M.P. 240–41°.

*Analysis.*—Calcd. for $C_{17}H_{20}Cl_2N_2O_2$ (percent): C, 57.46; H, 5.68; Cl, 19.96. Found (percent): C, 57.33; N, 5.47; Cl, 20.34; N, 8.03.

EXAMPLE 13

General procedure for preparation of 8-chloro-4H[1] benzopyrano[3,4-d]isoxazole-3-methyl amines A mixture of 3.0 g. (0.0127 mole) of 8-chloro-4H[1] benzopyrano[3,4-d]isoxazole-3-methanol, 0.52 g. (0.0127 mole) of a 59% NaH/oil dispersion and 60 ml. of benzene is stirred at room temperature for 1.5 hours. A solution of 2.66 g. (0.0133 mole) of recrystallized tosyl chloride in 25 ml. of benzene is added and stirring continued overnight. The mixture is then filtered and the filtrate stirred at 40° with 2–4 equivalents of the appropriate amine for 24 hours. The mixture is shaken with 50 ml. of 5% NaOH, 2×50 ml. of water and then 2×100 ml. 3 N HCl. The acid extracts are filtered from any solids and made basic. The basified mixture is extracted with ether and the extracts dried. The amine is then isolated as a salt.

The following amines were prepared by the decribed process: N,N-diethyl-8-chloro-4H[1]benzopyrano[3,4-d] isoxazole-3-methylamine fumarate, M.P. 162–163°.

*Analysis.*—Calcd. for $C_{19}H_{21}ClN_2O_6$ (percent): C, 55.82; H, 5.18; Cl, 8.67; N, 6.85. Found (percent): C, 55.55; H, 5.05; Cl, 9.11; N, 6.84.

N-isopropyl-8-chloro - 4H[1]benzopyrano[3,4-d]isoxazole-3-methylamine hydrochloride, M.P. 215–17°.

*Analysis.*—Calcd. for $C_{14}H_{16}Cl_2N_2O_2$ (percent): C, 53.35; H, 5.12; Cl, 22.49; N, 8.89. Found (percent): C, 53.20; H, 5.32; Cl, 22.20; N, 8.70.

3 - (N-pyrrolidinomethyl) - 8 - chloro - 4H[1]benzopyrano[3,4-d]isoxazole, M.P. 194–197°.

*Analysis.*—Calcd. for $C_{15}H_{16}Cl_2N_2O_2$ (percent): C, 55.06; H, 4.93; Cl, 21.68; N, 8.56. Found (percent): C, 55.22; H, 5.05; Cl, 21.10; N, 8.35.

We claim:

1. A compound of the formula

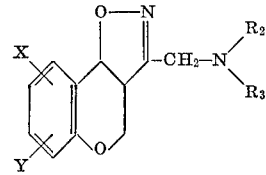

in which X and Y are hydrogen, halo, alkyl of 1 to 4 carbon atoms, alkoxy of 1 to 3 carbon atoms or trifluoromethyl, and $R_2$ and $R_3$ are selected from hydrogen, lower alkyl of 1 to 4 carbon atoms, phenyl-lower alkyl of 7 to 13 carbon atoms or cyclohexyl or pharmaceutically acceptable acid addition salts thereof.

2. A compound of claim 1 in which X and Y are hydrogen or chloro, and $R_2$ and $R_3$ are hydrogen, alkyl of 1 to 4 carbon atoms, cyclohexyl or benzyl.

3. A compound of claim 1 in which X and Y are hydrogen or chloro, $R_2$ and $R_3$ are hydrogen, alkyl of 1 to 4 carbon atoms or benzyl.

4. A compound of claim 1 in which X and Y are hydrogen or chloro, $R_2$ is hydrogen and $R_3$ is benzyl.

5. A compound of claim 1 in which X is chloro, Y is hydrogen, $R_2$ is hydrogen and $R_3$ is benzyl.

No references cited.

ALEX MAZEL, Primary Examiner

J. TOVAR, Assistant Examiner

U.S. Cl. X.R.

260—247.5, 268, 294.7; 424—272